Sept. 9, 1941.                H. A. TRIPLETT ET AL                2,255,400
                                MOUNTING BRACKET
                            Original Filed May 26, 1938

Inventors:
Hugh A. Triplett
Sigurd I. Lindell
By
Attys.

Patented Sept. 9, 1941

2,255,400

UNITED STATES PATENT OFFICE 2,255,400

MOUNTING BRACKET

Hugh A. Triplett, Wilmette, and Sigurd I. Lindell, Chicago, Ill., assignors to Schweitzer & Conrad, Inc., Chicago, Ill., a corporation of Delaware Original application May 26, 1938, Serial No. 210,122. Divided and this application November 6, 1939, Serial No. 302,986

3 Claims. (Cl. 248—74)

Our invention relates, generally, to means for clamping and supporting frangible members, such as insulators and the like, and it has particular relation to such clamping means wherein a yieldable clamping force is uniformly distributed around the frangible member.

This application is a division of our copending application, Serial No. 210,122, filed May 26, 1938.

An object of our invention is to securely clamp a frangible member without likelihood of cracking the same and without the use of cushioning or gasket means between the clamping means and the frangible member.

Another object of our invention is to firmly clamp a frangible member by yieldably drawing together the ends of a yieldable metallic band encircling the frangible member whereby the clamping force is uniformly distributed about the frangible member.

Still another object of our invention is to provide for simultaneously securely clamping a rigid member and a frangible member in such manner that the two members are held rigidly with respect to each other without likelihood of cracking the frangible member.

A further object of our invention is to provide for securely mounting a frangible member while at the same time permitting angular adjustment of the frangible member in an improved manner.

Other objects of our invention will, in part, be obvious and, in part, appear hereinafter.

Our invention, accordingly, is disclosed in the embodiment thereof shown in the accompanying drawing, and it comprises the features of construction, combination of elements, and arrangement of parts which will be exemplified in the construction hereinafter set forth, and the scope of the application of which will be indicated in the appended claims.

Figure 1:
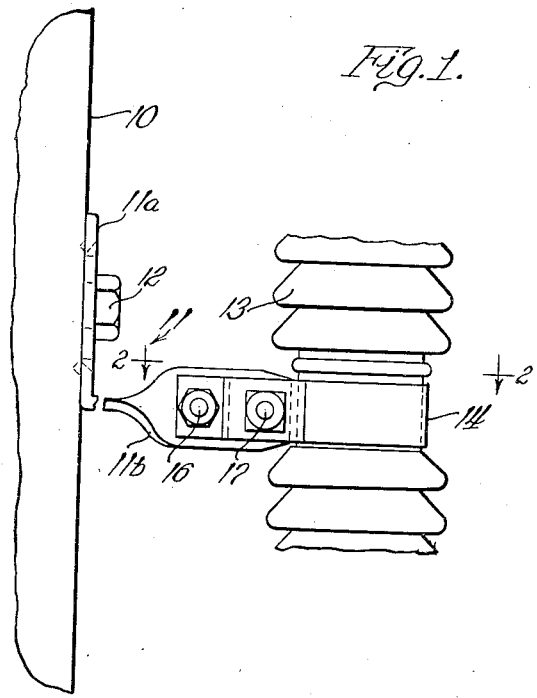
Figure 2:
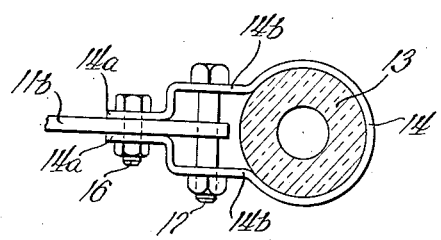

For a more complete understanding of the nature and scope of our invention, reference may be had to the following detailed description taken in connection with the accompanying drawing, in which:

Figure 1 is a side elevational view of the improved clamping means, showing its application to an insulator which is illustrated fragmentarily; and Figure 2 is a detail sectional view taken on the line 2—2 of Figure 1.

Referring now to the drawing, it will be observed that the reference character 10 designates any suitable support, such as a cross arm or pole on which a rigid member in the form of a bracket 11 is mounted by a suitable bolt 12 extending through the shank 11a. The bracket 11 is provided for carrying a hollow frangible member or insulator 13, such as an insulator for the fuse cutout disclosed in the aforesaid application of which this application is a division, by receiving on its opposite sides the apertured ears of a resilient flexible metallic band 14 which encircles the central part of the insulator 13. Suitable retaining means such as bolts 16 and 17 extend through the apertured ears of the band 14 and apertures in the ear 11b of the bracket 11 for securely mounting the frangible member or insulator 13 in position.

As illustrated more clearly in Figure 2, the apertured outer end portions 14a of the band 14 through which the bolt 16 extends engage the adjacent surfaces of the ear 11b, while the intermediate apertured end portions 14b are spaced or offset from the outer end of the ear 11b. The bolt 16 holds the frangible member or insulator 13 firmly to the bracket 11 while angular adjustment is permitted by loosening the bolt 17. The intermediate portions 14b are sufficiently flexible so as to prevent rigid clamping of the insulator 13 when the bolt 17 is tightened. Since the insulator 13 is usually formed of frangible material such as porcelain, it might be broken if it were clamped too tightly which is often the case when rigid rather than flexible clamp means is employed. The band 14 is also flexible enough to permit the end portions 14a to be spread apart and slipped over the mid-section of the insulator 13 in assembling the device.

The spaced apart intermediate sections 14b with the bolt 17 passing therethrough, constitute yieldable means for clamping the band 14 around the insulator 13. It is important to note that the intermediate portions 14b are spaced apart because the outer end portions 14a are inwardly offset therefrom. Thus, when the bolt 17 is tightened, the clamping force is indirectly applied in a yieldable manner to the band 14 so that it is actually tensioned instead of the force being unyieldingly applied thereto as would be the case were the intermediate portions 14b not thus spaced apart. In this manner the clamping force is uniformly distributed around the insulator 13 and is not localized at certain points. This permits a greater total clamping force to be applied without danger of fracture due to localized bearing force against the frangible member or insulator 13.

It will be seen that the two bolts 16 and 17 passing through the ear 11b provide a twopoint support which prevents rotation of the insulator 13 in a vertical plane with respect to the ear 11b. Relative rotation in a horizontal plane is prevented by the clamping action of the band 14 when the bolt 17 is tightened. Adjustment in this plane is permitted by loosening the bolt 17. It will be noted that bolt 17 performs two functions. First, it serves to draw together the intermediate portions 14b, thereby causing the band 14 to yieldingly grip the frangible member 13. Next, by extending through the ear 11b of the rigid member 11, it cooperates with the bolt 16 to prevent rotation of the rigid member with respect to the band 14.

Since certain changes may be made in the foregoing construction and different embodiments of the invention may be made without departing from the scope thereof, it is intended that all matter shown in the accompanying drawing or described hereinbefore shall be interpreted as illustrative and not in a limiting sense.

We claim as our invention:

1. A clamp for mounting an insulator of a fuse cutout and the like on a suitable support comprising, in combination, a band for encircling a cylindrical part of said insulator and having end portions extending outwardly therefrom, a bracket disposed to be secured to said support and having an ear extending between said end portions, said end portions of said band being offset in such manner that the outer portions engage the opposite sides of said ear and the intermediate portions are spaced from the opposite sides of said ear, a first bolt extending through said end portions and said ear for clamping the same together, and a second bolt extending through said intermediate portions and said ear for adjustably clamping said band to said insulator substantially independently of the clamping action of said first bolt.

2. Means for interconnecting a relatively rigid member and a frangible member comprising, in combination, a yieldable metallic band for embracing said frangible member and having end portions extending outwardly therefrom with the outer end portions offset toward each other and the intermediate end portions spaced apart, a retaining member for clamping said offset outer end portions to said rigid member, and another retaining member extending through said rigid member and cooperating with said spaced apart inner end portions to yieldingly clamp said metallic band to said frangible member.

3. Means for interconnecting a relatively rigid member and a frangible member comprising, in combination, a yieldable metallic band for embracing said frangible member and having end portions extending outwardly therefrom with the outer end portions offset toward each other and the intermediate end portions spaced apart, both said outer and intermediate end portions being adapted to receive said rigid member therebetween, a retaining member for clamping said offset outer end portions to said rigid member, and another retaining member extending through said rigid member and cooperating with said spaced apart inner end portions to yieldingly clamp said metallic band to said frangible member.

HUGH A. TRIPLETT.
SIGURD I. LINDELL.